United States Patent
Shin et al.

(10) Patent No.: US 9,256,093 B2
(45) Date of Patent: Feb. 9, 2016

(54) DISPLAY APPARATUS AND METHOD FOR MANUFACTURING THE SAME

(71) Applicant: LG DISPLAY CO., LTD., Seoul (KR)

(72) Inventors: Sung-Eui Shin, Paju-si (KR); Chang Soo Jang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 105 days.

(21) Appl. No.: 14/140,188

(22) Filed: Dec. 24, 2013

(65) Prior Publication Data

US 2014/0176854 A1    Jun. 26, 2014

(30) Foreign Application Priority Data

Dec. 26, 2012 (KR) .......... 10-2012-0153726
Dec. 13, 2013 (KR) .......... 10-2013-0155106

(51) Int. Cl.
*G02F 1/1333* (2006.01)

(52) U.S. Cl.
CPC ............. *G02F 1/133308* (2013.01); *G02F 2001/133317* (2013.01); *G02F 2202/28* (2013.01)

(58) Field of Classification Search
CPC ............. G02F 2001/133317; G02F 1/133308; G02F 2202/28
USPC ............................ 349/58, 122, 187; 445/24
See application file for complete search history.

(56) References Cited

U.S. PATENT DOCUMENTS

| | | |
|---|---|---|
| 2007/0153211 A1 | 7/2007 | Whitehead, Jr. et al. |
| 2009/0237602 A1 | 9/2009 | Kubota et al. |
| 2011/0149200 A1* | 6/2011 | Joo ............................... 349/61 |
| 2012/0230016 A1 | 9/2012 | Hashino et al. |
| 2012/0262907 A1 | 10/2012 | Lee et al. |

FOREIGN PATENT DOCUMENTS

| | | |
|---|---|---|
| CN | 102750879 A | 10/2012 |
| JP | 2007-304178 A | 11/2007 |
| JP | 2010-060591 A | 3/2010 |
| JP | 2010-066711 | 3/2010 |
| JP | 2011-164185 A | 8/2011 |
| JP | 2012-98393 A | 5/2012 |
| JP | 2012-215621 | 11/2012 |
| JP | 2013-132435 A | 7/2013 |
| TW | 201001001 A1 | 1/2010 |

OTHER PUBLICATIONS

Computer translation of JP 2011-164185, Aug. 2011, pp. 1-15.*
Computer translation of JP 2010-060591, Mar. 2010, pp. 1-22.*

* cited by examiner

*Primary Examiner* — Dung Nguyen
*Assistant Examiner* — Tai Duong
(74) *Attorney, Agent, or Firm* — Dentons US LLP

(57) ABSTRACT

A display apparatus includes a display panel including an upper substrate and a lower substrate coupled to a rear surface of the upper substrate; a guide frame supporting the display panel, and a coupling member coupling the guide frame to the display panel. The coupling includes a main adhesive adhering the guide frame to the display panel, and a sub adhesive adhered to the guide frame adjacent to the main adhesive. Accordingly, the display panel can more readily absorb an impact applied thereto, thus enhancing the stability of the display panel.

20 Claims, 6 Drawing Sheets

DISPLAY APPARATUS AND METHOD FOR MANUFACTURING THE SAME

CROSS-REFERENCE TO RELATED APPLICATIONS

This application claims the benefit of the Korean Patent Application Nos. 10-2012-0153726 filed on Dec. 26, 2012, and 10-2013-0155106 filed on Dec. 13, 2013, which are hereby incorporated by reference in their entirety as if fully set forth herein.

BACKGROUND

1. Field of the Invention

The present invention relates to a display device and a method of manufacturing the same.

2. Discussion of the Related Art

Recently, flat panel display devices that can decrease weight and volume compared to cathode ray tubes (CRTs) are being developed. Liquid crystal display (LCD) devices, plasma display panels (PDPs), field emission display (FED) devices, and light emitting display devices are actively being researched as flat type display devices. However, among such flat panel display devices, LCD devices are easily manufactured, have good drivability, realize a high-quality image, and thus are attracting much attention.

In terms of technology and design interesting to consumers, research and development of flat panel display devices are increasingly required. Therefore, efforts are being continuously made for minimizing (slimming) the thicknesses of display devices, and research is increasingly conducted on designs with enhanced aesthetic appearance that can induce consumers to buy by appealing to the consumers' sense of style.

However, in design development for enhancing style or slimming of display devices that have been made to date, elements configuring a related art display device have been applied as is, and the structures of the elements have been changed. Due to these reasons, there are limitations in slimming display devices and developing the new designs of the display devices.

For example, in LCD devices of the related art, a lower case and a front case are necessarily used for housing and protecting a liquid crystal display panel and a backlight unit. Moreover, a separate front set cover and rear set cover are additionally used for assembling the LCD devices into notebook computers, monitors, mobile devices, televisions, etc.

Figure 1:
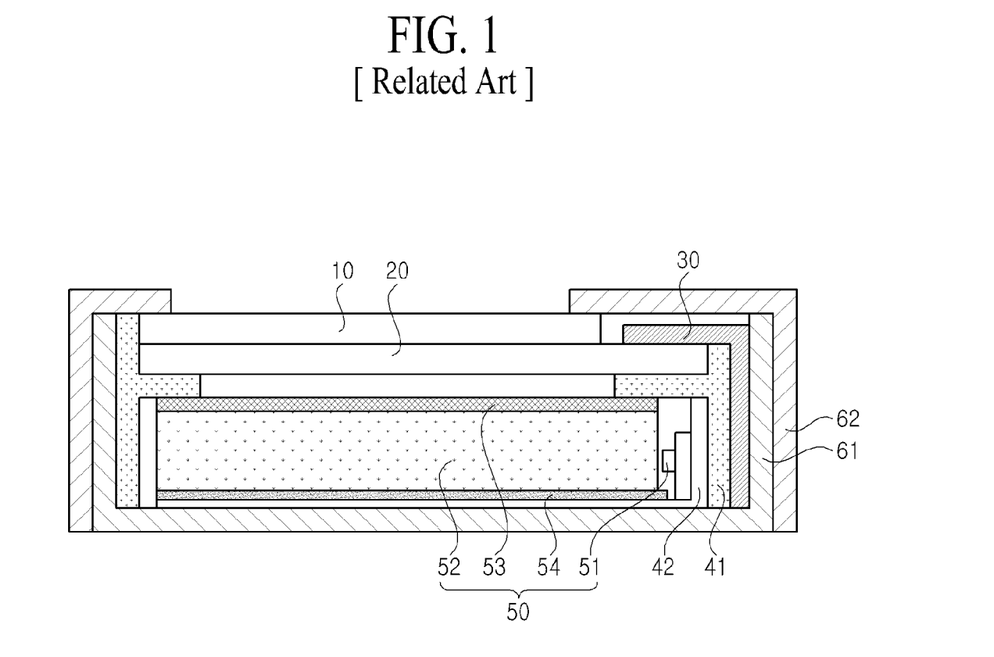
FIG. 1 is a sectional view schematically illustrating a related art LCD device.

As described above, display devices of the related art necessarily use the front set cover and rear set cover as well as the lower case and front case, and consequently, there are limitations in reducing the thicknesses of LCD devices or changing their designs. Particularly, the front set cover and rear set cover necessarily cover a top edge of a liquid crystal display panel. For this reason, the thicknesses of display devices inevitably become thicker, and moreover, the border widths of the display devices enlarge. In addition, it is difficult to realize various innovative designs due to a step height in a border portion between a cover and the display panel. Hereinafter, a related art LCD device will be described in detail with reference to FIG. 1. FIG. 1 is a sectional view schematically illustrating a related art LCD device.

As seen in FIG. 1, the related art LCD device includes an upper substrate 10, a lower substrate 20, a driver 30, a guide frame 41, a support case 42, a backlight unit 50, a lower cover 61, and an upper cover 62.

The upper substrate 10 and the lower substrate 20 are coupled to each other by a sealant, and a liquid crystal layer (not shown) is disposed between the two substrates 10 and 20.

Although not shown, a black matrix and a color filter are disposed on the upper substrate 10, and a gate line, a data line, a thin film transistor (TFT), and a pixel electrode are disposed on the lower substrate 20. Here, each of these elements are formed in plurality.

The driver 30 applies respective signals to the gate lines and data lines disposed on the lower substrate 20 to drive the LCD device. In order to apply the respective signals to the gate lines and data lines disposed on the lower substrate 20, a peripheral portion of one side of the lower substrate 20 is extended longer than a peripheral portion of one side of the upper substrate 10, and the driver 30 is connected to the long-extended peripheral portion of one side of the lower substrate 20.

The guide frame 41 orients respective positions of the coupled substrates 10 and 20 and the backlight unit 50, and the support case 42 supports the backlight unit 50.

The backlight unit 50 includes a light source 51, a light guide plate 52, an optical sheet 53, and a reflective sheet 54.

The lower cover 61 and the upper cover 62 surround all of the above-described elements, and cover the LCD device.

In this example, the upper cover 62 covers a peripheral portion of a top of the upper substrate 10; thus, preventing the driver 30 from being exposed to the outside and preventing light from the backlight leaking around or from the peripheral portions of the upper substrate 10. However, as described above, because the upper cover 62 surrounds all of the peripheral portions of the upper substrate 10, step heights respectively occur where the upper cover meets the upper substrate and bezel widths along all four border of the LCD device are enlarged, causing a decrease in the aesthetic appearance of the LCD device.

SUMMARY

Accordingly, the present invention is directed to provide a display device and a method of manufacturing the same that substantially obviate one or more problems due to limitations and disadvantages of the related art.

An aspect of the present invention is directed to provide a display device and a method of manufacturing the same in which, by removing some case and set cover components, device thickness and front border width are minimized, and a step height at the front border portion is removed.

Another aspect of the present invention is directed to provide a display device and a method of manufacturing the same in which a display panel and a guide frame maintain a constant interval between each other, to help absorb an impact.

Another aspect of the present invention is directed to provide a display device and a method of manufacturing the same, which can minimize the leakage of light from a display panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a display panel including an upper substrate and a lower substrate facing-coupled to a rear surface of the upper substrate; a guide frame supporting the display panel; and a coupling member coupling the guide frame to the display panel, wherein the coupling member includes: a main adhesive member adhering the guide frame to the display panel; and a sub adhesive member adhered to the guide frame adjacently to the main adhesive member.

In another aspect of the present invention, there is provided a method of manufacturing a display device which includes: preparing a guide frame which includes a horizontal part facing a bottom of a display panel and a vertical part extended from the horizontal part; dispensing and hardening a sub adhesive member on the horizontal part; dispensing a main adhesive member on the horizontal part in contact with or adjacently to the sub adhesive member; coupling the guide frame to the display panel to bring the bottom of the display panel into contact with the main adhesive member; and hardening the main adhesive member, wherein the hardened main adhesive member has a height higher than the sub adhesive member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, a display device and a method of manufacturing the same according to the present invention will be described in detail with reference to the accompanying drawings.

Figure 2:
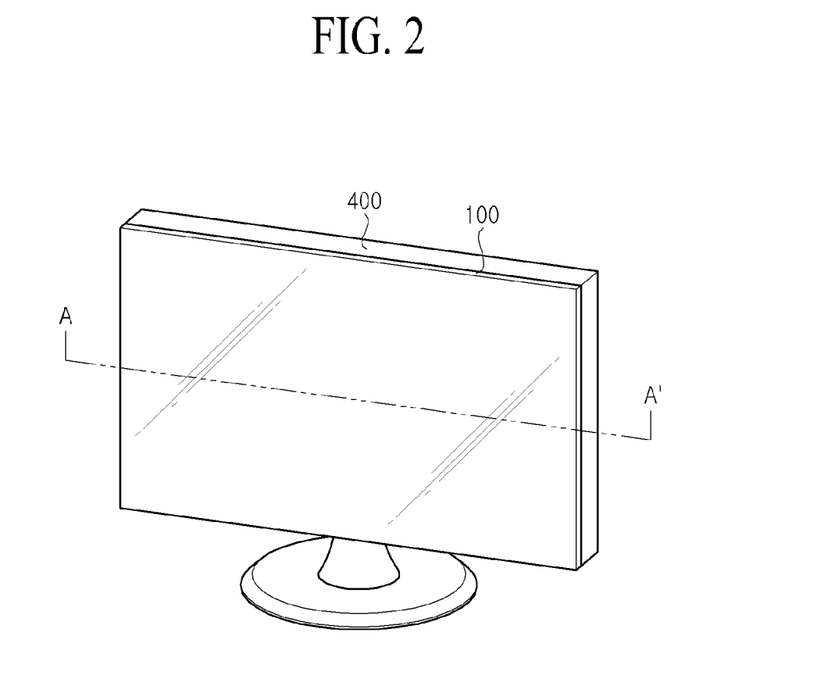
FIG. 2 is a perspective view illustrating an exemplary embodiment of a display device according to the present invention.
Figure 3:
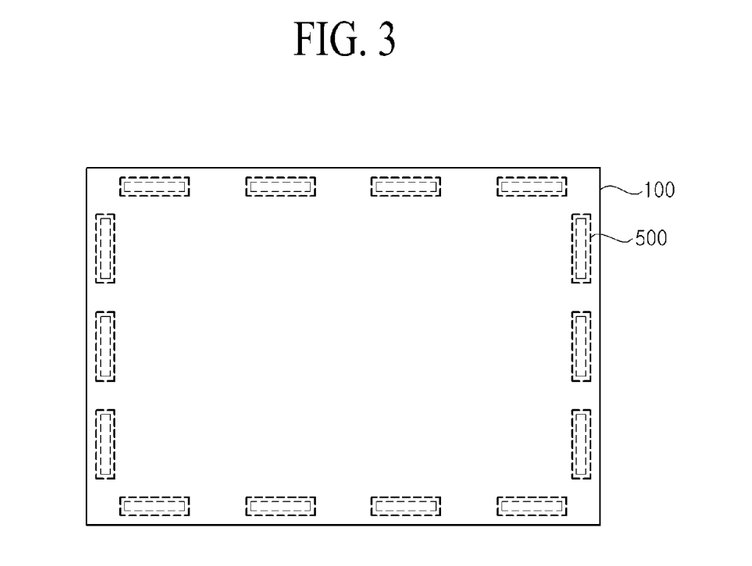
FIG. 3 is a plan view illustrating an embodiment of the display device of the present invention of FIG. 2.
Figure 4:
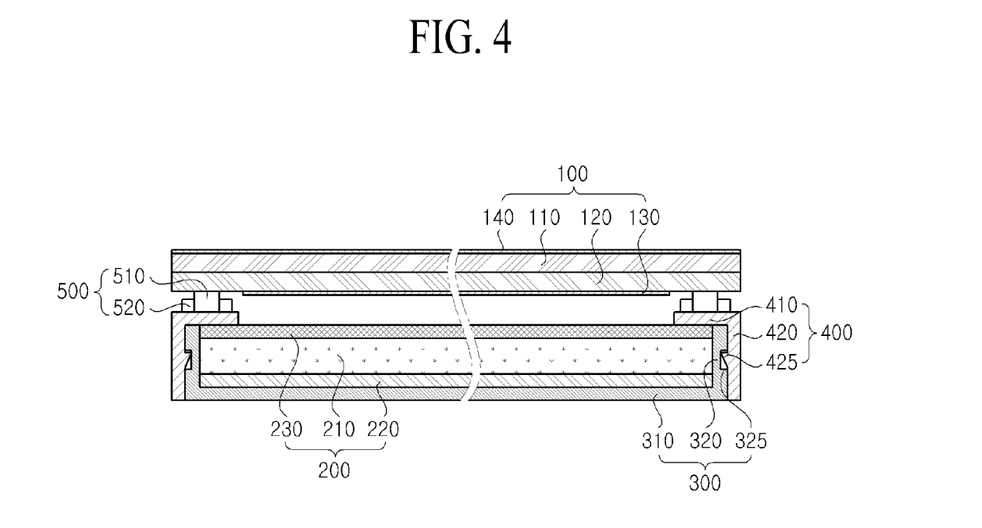
FIG. 4 is a sectional view illustrating an embodiment of a sectional plane taken along line A-A' of the display device of the present invention of FIG. 2.
Figure 5:
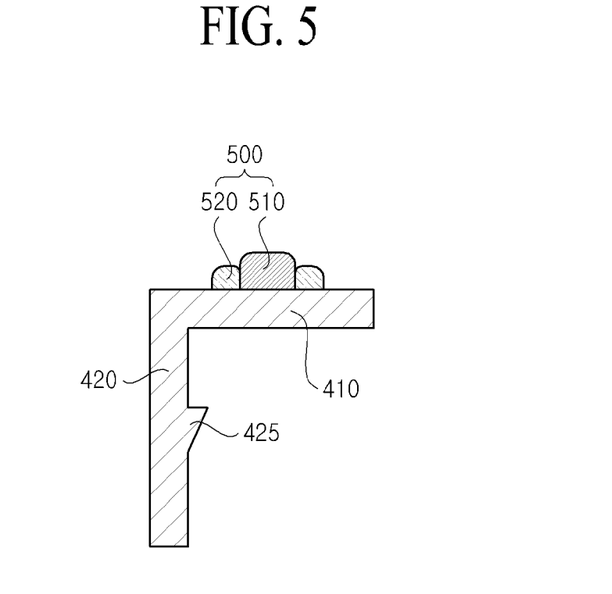
FIG. 5 is a view illustrating an exemplary embodiment of a structure at a top of a guide frame according to the present invention.

FIG. 2 is a perspective view illustrating an exemplary embodiment of a display device according to the present invention. FIG. 3 is a plan view illustrating an embodiment of the display device of the present invention of FIG. 2. FIG. 4 is a sectional view illustrating an embodiment of a sectional plane taken along line A-A' of the display device of the present invention of FIG. 2. FIG. 5 is a view illustrating an embodiment of a structure at a top of a guide frame according to the present invention.

As illustrated in FIGS. 2 to 5, the display device according to an embodiment of the present invention may include a display panel 100, a backlight unit 200, a cover member 300, a guide frame 400, and a coupling member 500.

The display panel 100 may include an upper substrate 110, a lower substrate 120 coupled to the upper substrate 110 with a liquid crystal layer (not shown) therebetween, a lower polarizing film 130 disposed at a rear surface of the lower substrate 120, and an upper polarizing film 140 disposed at a front surface of the upper substrate 110.

The lower substrate 120 may include a plurality of pixels (not shown) that are respectively formed in a plurality of areas defined by intersections between a plurality of gate lines (not shown) and a plurality of data lines (not shown). Each of the pixels may include a TFT (not shown) connected to a gate line and a data line, a pixel electrode connected to the TFT, and a common electrode that is formed adjacently to the pixel electrode and receives a common voltage. In this case, the common electrode may be formed in the upper substrate 110 depending on a liquid crystal driving mode for the liquid crystal layer. The lower substrate 120 generates an electric field corresponding to a difference voltage between a data voltage applied to each pixel and the common voltage, thereby adjusting light transmittance of the liquid crystal layer.

The upper substrate 110 may include a color filter corresponding to each pixel formed in the lower substrate 120, and is coupled to the lower substrate 120 with the liquid crystal layer therebetween. In this case, a common electrode to which the common voltage is applied depending on a driving mode of the liquid crystal layer may be formed in the upper substrate 110. The upper substrate 110 filters light incident through the liquid crystal layer by using a plurality of the color filters, and transmits certain color light to the outside, thereby allowing the display panel 100 to display a color image.

The lower substrate 120 and the upper substrate 110 may form in various types of display panels known to those skilled in the art, depending on the driving mode of the liquid crystal layer, for example, a twisted nematic (TN) mode, a vertical alignment (VA) mode, an in-plane switching (IPS) mode, and a fringe field switching (FFS) mode.

The above description has been made of the display panel 100 in which the upper substrate 110 includes a plurality of the color filters and the lower substrate 120 includes the plurality of gate lines, the plurality of data lines, and a plurality of the TFTs, but the present invention is not limited thereto. As another example, the present invention may include a display panel 100 having the reverse structure in which the upper substrate 110 includes the plurality of gate lines, the plurality of data lines, and the plurality of TFTs and the lower substrate 120 includes the plurality of color filters.

The lower polarizing film 130 may be adhered to a rear surface of the lower substrate 120 and polarizes light from the backlight unit illuminating the display panel 100.

The upper polarizing film 140 is disposed at the front surface of the upper substrate 110, and polarizes light passing through the display panel 100.

Although not shown, a retarder film may be disposed at a top of the upper polarizing film 140. The retarder film may be adhered to an entire front surface of the upper polarizing film 140, and may include a plurality of first retarder patterns disposed at certain intervals and a plurality of second retarder patterns disposed at respective gaps between the plurality of first retarder patterns.

The retarder film may be adhered to the entire front surface of the upper polarizing film 140, and may segment a left-eye image and a right-eye image in the formation of a three-dimensional (3D) image. To this end, the retarder film may include a plurality of first retarder patterns respectively overlapping vertical or horizontal lines of the display panel 100 displaying the left-eye image, and a plurality of second retarder patterns disposed at the respective gaps between the first retarder patterns respectively overlapping vertical or horizontal lines of the display panel 100 displaying the right-eye image. The first and second retarder patterns changes an optical axis of each of the left-eye image and right-eye image, emitted from the display panel 100 to the outside, to another optical axis.

The backlight unit 200 may include a light guide plate 210, a reflective sheet 220, and an optical member 230 which are placed in the cover member 300. The light guide plate 210 may be disposed in a flat type (or a wedge type) and guides light, inputted from a light source (not shown) through a light incident surface, to the display panel 100. Here, the light source may include at least one fluorescent lamp or Light Emitting Diode (LED). The reflective sheet 220 may be disposed at a rear surface of the light guide plate 210 and reflects light, which is incident from the light guide plate 210, to the display panel 100. The optical member 230 may be disposed on the light guide plate 210 and enhances luminance characteristics of light traveling from the light guide plate 210 to the display panel 100. To this end, the optical member 230 may include at least one or more diffusive sheets and prism sheets.

The cover member 300 may include a set plate 310, a side part 320, and a first coupling part 325. The cover member 300 may receive the backlight unit 200, and aligns the backlight position. In an embodiment, the cover member 300 receives the backlight unit 200, and supports a side of the display panel 100 and a side of the guide frame 400, thereby acting as a backside product cover for a produced display device. However, in FIG. 4, the cover member 300 also supports an inner side surface of the guide frame 400, but is not limited thereto. As another example, the cover member 300 may be disposed to support an outer side surface of the guide frame 400.

The set plate 310 may have in a flat shape, and support the backlight unit 200, thereby acting as a backside product cover for a produced display device. The side part 320 may be formed to be bent vertically from an edge portion of the set plate 310. In an embodiment, the side part 320 may be the same height as the backlight unit 200.

As illustrated in FIGS. 4 and 5, the first coupling part 325 may be concavely formed to have a certain depth from an inner side wall of the side part 320 to correspond with a second coupling part 425. In this case, the second coupling part 425 is inserted into the first coupling part 325, thereby coupling the guide frame 400 and the cover member 300. Here, a stepped surface of the second coupling part 425 may prevent deviation of the second coupling part 425 coupled to the first coupling part 325. As shown, an inclined surface of the second coupling part 425 facilitates the coupling of the first and second coupling parts 325 and 425.

It has been described above that the first coupling part 325 is concavely formed and the second coupling part 425 has the stepped surface and the inclined surface, but the present invention is not limited thereto. On the contrary, the first coupling part 325 may have the stepped surface and an inclined surface, and the second coupling part 425 may have a concave portion.

Additionally, the side part 320 and the guide frame 400 may be coupled by a screw or the like to enhance coupling strength.

The guide frame 400 may support the display panel 100, and guide a position of the display panel 100 and a position of the backlight unit 200. To this end, the guide frame 400 may include a horizontally extended horizontal part 410 and a vertical part 420 which is bent vertically and extended from one end of the horizontal part 410. The horizontal part 410 may be horizontally extended to support the display panel 100.

The coupling member 500 may couple the lower substrate 120 and guide frame 400. To this end, the coupling member 500 may include a main adhesive 510 and a sub adhesive 520. The main adhesive 510, an adhesive that may have a liquid component, is adhered to a portion of the horizontal part 410 of the guide frame 400 and the lower substrate 120 of the display panel 100 to fix the display panel 100 to the guide frame 400, by extension, to and the cover member 300. The sub adhesive 520 may be disposed in contact with or adjacent to one or two sides of the main adhesive 510. The sub adhesive 520 may be formed by first dispensing an adhesive having a liquid component, and may perform a guide function of preventing the external spread of the main adhesive 510. To this end, the main adhesive 510 and the sub adhesive 520 may include at least one or more of an acrylic-based material, a rubber-based material, and a silicon-based material which are cured and hardened by light or heat and have adhesive properties.

Ultraviolet (UV) radiation may be used for quick curing, for which a photocurable oligomer resin may be used as the adhesive having a liquid component. As an example of a photocurable oligomer component, there are urethane modified (meta)acrylate, carbonate group introduced urethane modified (meta)acrylate, and silicon introduced urethane modified (meta)acrylate. For example, urethane modified (meta)acrylate is disclosed Japanese Patent Laid-Open Publication Nos. 2006-89627 and 2008-291114, carbonate group introduced urethane modified (meta)acrylate is disclosed Japanese Patent Laid-Open Publication Nos. 2006-45341 and 2007-314768, and silicon introduced urethane modified (meta)acrylate is disclosed Japanese Patent Laid-Open Publication No. 2007-308680, but are not limited thereto.

Figure 6A:
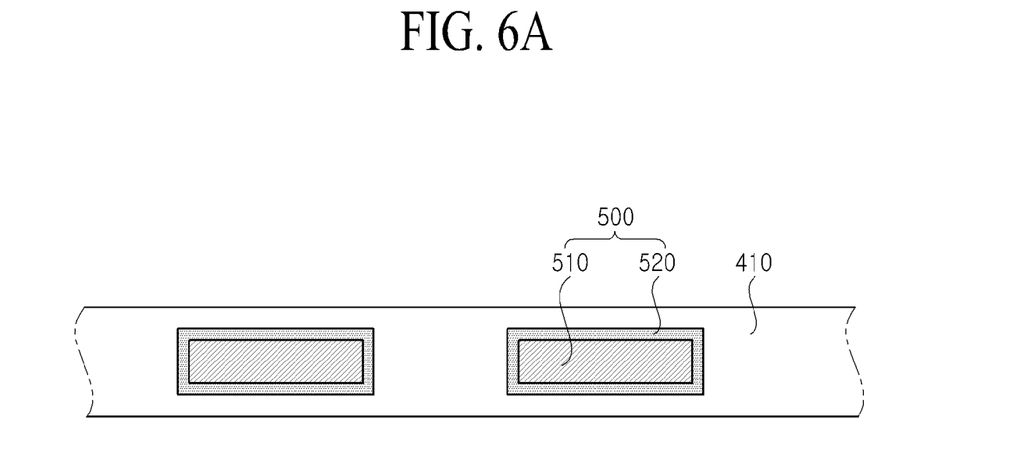
FIGS. 6A to 6C are views illustrating an exemplary embodiment of a shape structure of a main adhesive member and a sub adhesive member according to the present invention.
Figure 6B:
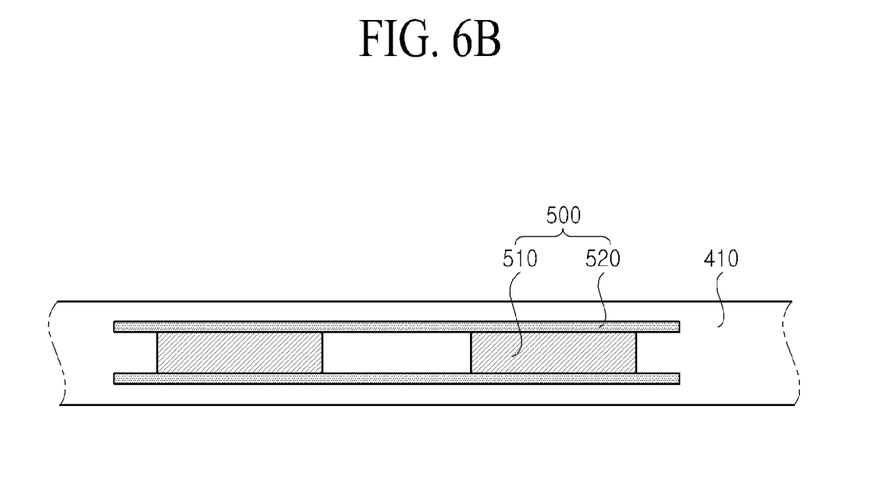

FIGS. 6A to 6B are top views illustrating the horizontal part 410 of the guide frame 400 in which the main adhesive 510 and the sub adhesive 520 are disposed.

Referring to FIG. 6A, the main adhesive 510 and the sub adhesive 520 may be formed on the horizontal part 410 of the guide frame 400. At this time, a plurality of main adhesive 510 units may be formed to be separated from each other, and the sub adhesive member 520 may be formed to surround four surfaces of the main adhesive 510 units.

The sub adhesive 520 may be formed and hardened prior to the main adhesive 510, and acts as a dam or a wall so as to prevent the main adhesive 510 from being spread to the outside during a process of hardening and coupling the display panel 100 and the guide frame 400.

When the display panel 100 and the guide frame 400 are coupled to each other by only the main adhesive 510 without the sub adhesive 520, an uncured main adhesive can spread to the outside, in which case an outer border of the display panel 100 must be widened to minimize a defect due to the spread. Therefore, by providing the sub adhesive 520, a cured main adhesive width from the uncured liquid adhesive can be minimized, thus minimizing a display panel border portion.

Referring to FIG. 6B, the main adhesive 510 and the sub adhesive 520 may be formed on the horizontal part 410 of the guide frame 400, and the sub adhesive 520 may be respectively formed such that the main adhesive 510 may be disposed between the sub adhesive 520. However, the present embodiment is not limited thereto. According to another embodiment, the sub adhesive 520 may be disposed at only an outer side surface of the main adhesive 510 so as to minimize an outer border and prevent uncured liquid adhesive from being spread to the outside.

Figure 6C:
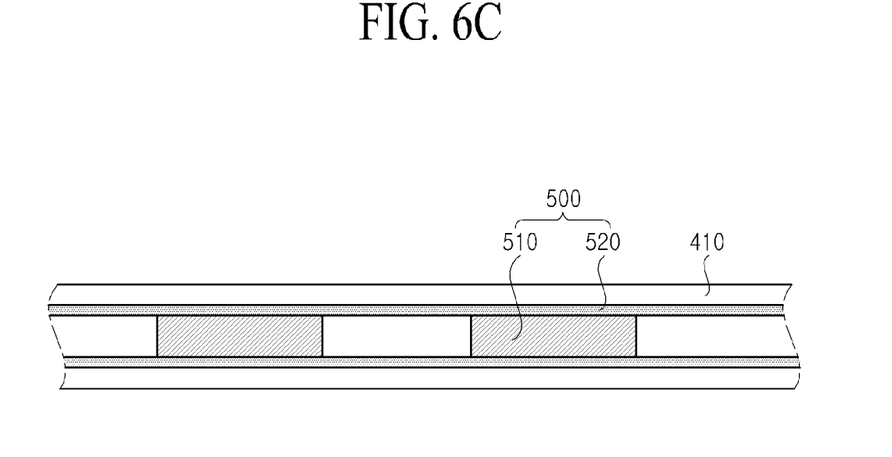

Referring to FIG. 6C, the main adhesive 510 and the sub adhesive 520 may be formed on the horizontal part 410 of the guide frame 400, and the sub adhesive 520 may be formed as one body over all borders of the guide frame 400.

When the main adhesive members 510 are formed as one body along the guide frame 400 the display panel 100 and the guide frame 400 may be too strongly fixed, and thus, light leakage may be caused by thermal changes. The plurality of main adhesive units 510 may be formed to be separated from each other.

When the display panel 100 is adhered to the guide frame 400 without a gap between the two and formed with an elastic adhesive, the display panel 100 can be more subject to damage by temperature changes or an external impact.

Moreover, when the display panel 100 is fixed without a gap between the guide frame 400, the display panel 100 can be locally deformed by differences of thermal expansion rates due to temperature changes. Localized display deformities can also change a path of light emitted from the backlight unit 200. For this reason, light leakage corresponding to the limitation of LCD devices can easily occur. To prevent this problem, the main adhesive 510 may have a certain height and elasticity in order for the display panel 100 to maintain a gap from the guide frame 400.

The sub adhesive 520 may prevent the uncured liquid adhesive of the main adhesive member 510 from running over to the outside, and restricts a Z-axis movement of the display panel 100.

Some movement of the display panel 100 with temperature changes is required to minimize light leakage and absorb impacts, but, when the display panel 100 is excessively pushed toward the guide frame 400, the two elements can be damaged by the direct contact of the two, and also undesired light leakage can occur. To minimize such problems, the sub adhesive 520 may be formed to a certain height, and a height of the hardened sub adhesive 520 is limited to a height that enables the display panel 100 to be maximally pushed in a direction of the guide frame 400.

The sub adhesive 520 may help the main adhesive 510 to provide a gap between the display panel 100 and the guide frame 400, The sub adhesive 520 is characterized as a high-viscosity adhesive of which after-hardening hardness is higher than the adhesive material of the main adhesive member 510 in order minimize deformation and spreading of the cured main adhesive 510 caused by pressure on the display panel 100.

In each of the above-described embodiments of the present invention, the display device has been described as being an LCD device including the display panel 100 and the backlight unit 200. However, the display device according to the present invention is not limited thereto, and for example, the display panel 100 may be replaced by an organic light emitting display panel including a plurality of organic light emitting elements. In this case, since the organic light emitting display panel is a self-emitting element, the backlight unit 200 is not necessary.

In this case, the display panel 100 that is the organic light emitting display panel may include a lower substrate and an upper substrate coupled to the lower substrate. The lower substrate may include a plurality of emission pixels that are respectively formed in a plurality of areas defined by a plurality of gate line, data lines, and power lines. Each of the emission pixels may include at least one switching transistor connected to a gate line and a data line, at least one driving transistor connected to the switching transistor and a power line, and a light emitting element that emits light with a current controlled according to the switching of the driving transistor. The upper substrate is coupled to the lower substrate, and protects the plurality of light emitting elements formed on the lower substrate. Here, the upper substrate may include a plurality of light emitting elements respectively connected to the plurality of driving transistors formed in the lower substrate, in which case the light emitting elements are not provided on the lower substrate.

FIGS. 7A to 7D are views illustrating an exemplary embodiment of a method of manufacturing a display device according to the present invention.

Figure 7A:
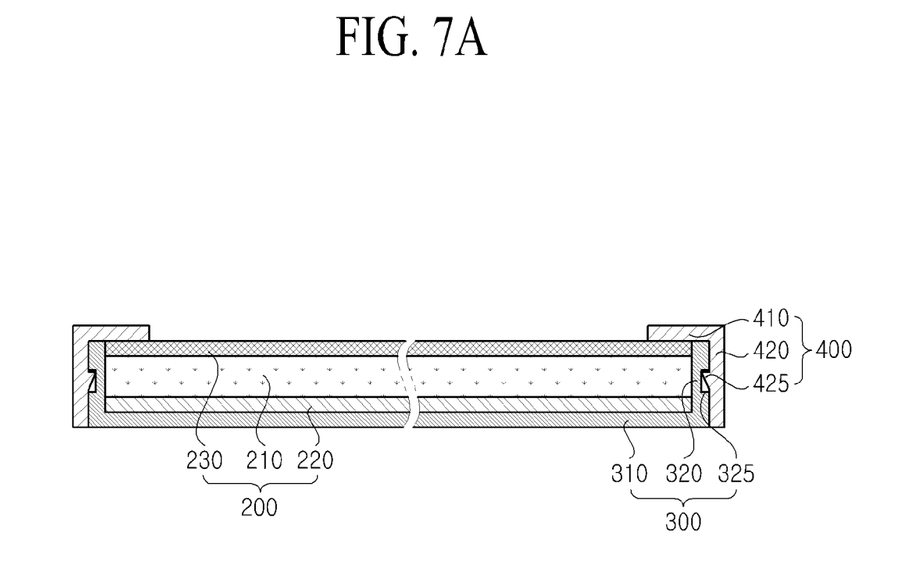
FIGS. 7A to 7D are views illustrating an exemplary embodiment of a method of manufacturing a display device according to the present invention.

As seen in FIG. 7A, the backlight unit 200 supplying light to the display panel 100 may be placed in the cover member 300. The guide frame 400, including the horizontal part 410 supporting the rear of the display panel 100 and the vertical part 420 extended from the horizontal part 410, is coupled to the cover member 300. In this case, the guide frame 400 does not cover the side surface of the display panel 100, as illustrated in FIG. 7D.

Figure 7B:
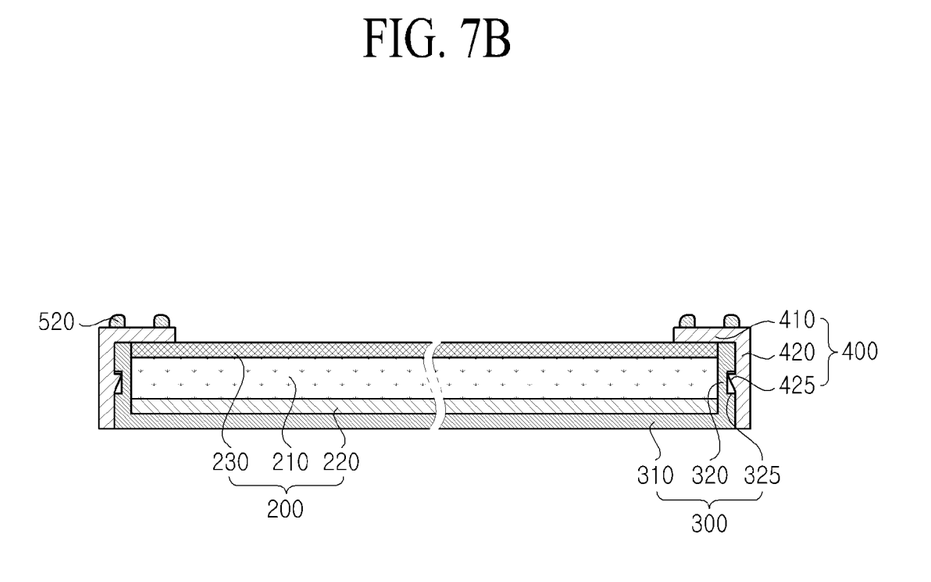

Subsequently, as seen in FIG. 7B, the sub adhesive 520 may be coated on the horizontal part 410. To this end, a dispenser coats a liquid adhesive on the horizontal part 410. The sub adhesive 520 may be formed to surround the main adhesive 510, formed in contact with or adjacent to one or two sides of the main adhesive 510, formed as one body over all borders of the guide frame 400, or formed in only a specific area.

The sub adhesive 520 may include at least one or more materials, having adhesive properties, such as an acrylic-based material, a rubber-based material, a silicon-based material, etc.

UV light may be used for quick curing and hardening, for which a photocurable oligomer resin may be used as the adhesive having a liquid component. As an example of a photocurable oligomer component, there are urethane modified (meta)acrylate, carbonate group introduced urethane modified (meta)acrylate, and silicon introduced urethane modified (meta)acrylate.

Subsequently, the coated adhesive of the sub adhesive 520 is completely cured and hardened. Depending on the adhesive material, the sub adhesive 520 is cured and hardened at a room temperature after a predetermined time elapses, hardened by applying heat at a predetermined temperature, or hardened by irradiating UV. Using UV, hardening may be performed simultaneously with dispensing.

Figure 7C:
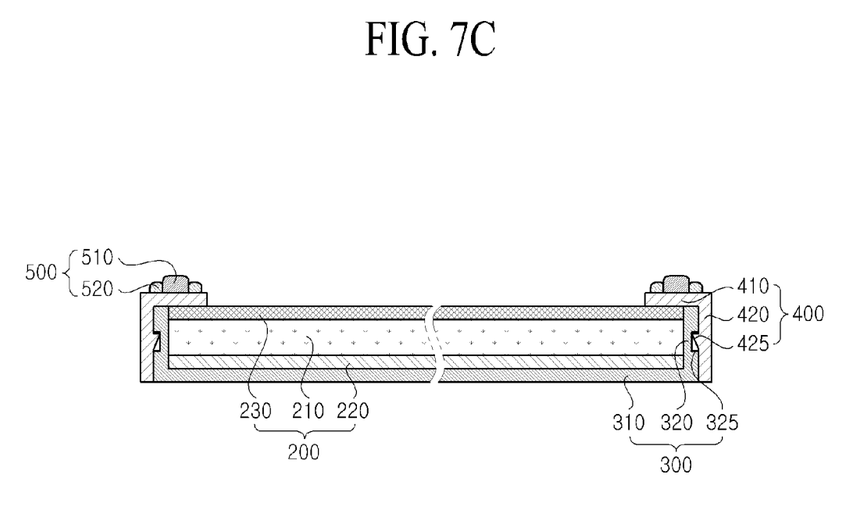
Figure 7D:
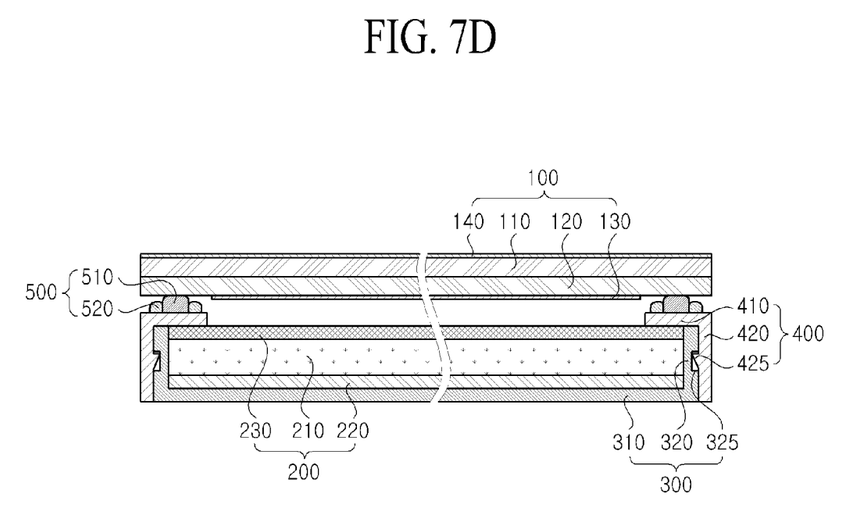

Subsequently, as seen in FIG. 7C, the main adhesive 510 may be coated on the horizontal part 410. To this end, a dispenser coats a liquid adhesive on the horizontal part 410.

The main adhesive member 510 is coated near where the sub adhesive 520 is disposed. As in FIG. 6, the main adhesive 510 may be coated in contact with or adjacent to an area in which the sub adhesive 520 is disposed. Also, the main adhesive 510 and the sub adhesive 520 may be provided as one body over an entire border of the guide frame 400, or disposed in only a specific area.

The main adhesive 510 may be formed of the same material as the sub adhesive 520, or formed of a material different from that of the sub adhesive 520. The main adhesive 510 may be formed to have a gap so as to minimize problems such as light leakage and damage due to an impact applied to the display panel 100, and thus may have viscosity lower than the material of the sub adhesive 520 used for a supporting function.

Subsequently, as seen in FIG. 7D, the guide frame 400 is coupled to the display panel 100. Since the main adhesive 510 contacts the display panel 100 and the guide frame 400, by curing and hardening the main adhesive 510, the display panel 100 is coupled to the guide frame 400.

Before coupling the guide frame 400 to the display panel 100, pre-hardening work may be performed for maintaining the shape of the main adhesive 510. Also, the main adhesive 510 may be cured and hardened at a room temperature after a predetermine time elapses, cured and hardened by applying heat at a predetermined temperature, or hardened by irradiating UV.

According to the embodiments of the present invention, by removing an upper case and a front set cover, a thickness and a front border width of a display device are minimized, and a step height of a front border portion is removed, thus enhancing an aesthetic appearance in terms of a design.

Moreover, the display panel and the guide frame maintain a constant interval between the two allowing for a better absorption of an impact.

Moreover, the leakage of light from a display panel can be minimized.

Moreover, adhesive strength between the display panel and the guide panel can be enhanced, and thus, the display panel and the guide panel can be adhered to each other with a smaller adhesive area.

Moreover, the display panel may better absorb an impact applied thereto, thus enhancing the stability of the display panel.

Moreover, light leakage between the display panel and the guide panel can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flat panel display apparatus, comprising:
 a display panel comprising an upper substrate and a lower substrate;
 a guide frame supporting the display panel; and
 a coupling member between the guide frame and the display panel,
 wherein the coupling member comprises:
  a main adhesive adhering the guide frame to the display panel, the main adhesive including a first side facing a center of the flat panel display apparatus and a second side opposite to the first side; and
  a sub adhesive on the guide frame and in contact with both the first and the second sides of the main adhesive.

2. The display apparatus of claim 1, wherein the sub adhesive comprises first and second parts separated from each other,
 wherein the first and the second parts contact the first and the second sides of the main adhesive, respectively.

3. The display apparatus of claim 1, wherein the sub adhesive surrounds the main adhesive.

4. The display apparatus of claim 1, wherein a height of the sub adhesive is lower than a height of the main adhesive.

5. The display apparatus of claim 1, wherein an uncured sub adhesive material has viscosity higher than an uncured main adhesive material.

6. The display apparatus of claim 1, wherein the sub adhesive is harder than the main adhesive.

7. The display apparatus of claim 1, wherein the guide frame comprises a horizontal portion supporting a rear of the display panel and a vertical portion extended from the horizontal portion.

8. The display apparatus of claim 6, wherein the main adhesive and the sub adhesive are on a horizontal portion of the guide frame.

9. The display apparatus of claim 8, wherein the main adhesive and the sub adhesive are disposed continuously as one body along the guide frame.

10. The display apparatus of claim 8, wherein the main adhesive and the sub adhesive are disposed at a plurality of portions along the horizontal part of the guide frame.

11. The display apparatus of claim 8, wherein the main adhesive is disposed at a plurality of portions of the guide frame and the sub adhesive is continuously disposed as one body along the guide frame.

12. A method of manufacturing a display apparatus, comprising:
 preparing a guide frame which comprises a horizontal portion to face a rear of a display panel and a vertical portion extended from the horizontal portion;
 dispensing and curing a sub adhesive on the horizontal portion;
 dispensing a main adhesive on the horizontal portion in contact with or adjacent to the sub adhesive;
 coupling the guide frame to the display panel to bring the rear of the display panel into contact with the main adhesive; and
 curing the main adhesive,
 wherein a cured main adhesive has a height higher than the sub adhesive.

13. The method of claim 12, wherein the main adhesive and the sub adhesive are naturally cured at a room temperature after a predetermined time elapses, cured by applying heat at a predetermined temperature, or cured by irradiating ultraviolet (UV).

14. The method of claim 12, wherein an uncured sub adhesive material has viscosity higher than an uncured main adhesive material.

15. The method of claim 12, wherein the sub adhesive is harder than the main adhesive.

16. The method of claim 12, wherein the horizontal portion supports a rear of the display panel.

17. The method of claim 16, wherein the main adhesive and the sub adhesive are disposed on the horizontal portion of the guide frame.

18. The method of claim 16, wherein the main adhesive and the sub adhesive are disposed continuously as one body along the guide frame.

19. The method of claim 16, wherein the main adhesive and the sub adhesive are disposed at a plurality of portions of the guide frame.

20. The method of claim 16, wherein the main adhesive is disposed at a plurality of portions of the guide frame and the sub adhesive is continuously disposed as one body along the guide frame.

* * * * *